United States Patent
Wong

(10) Patent No.: US 11,430,011 B2
(45) Date of Patent: Aug. 30, 2022

(54) METHODS AND COMPUTER-READABLE MEDIA FOR CARRYING OUT PROMOTIONAL CAMPAIGNS

(71) Applicant: BCE INC., Verdun (CA)

(72) Inventor: Alexander Hoi Wong, Markham (CA)

(73) Assignee: BCE INC., Verdun (CA)

( * ) Notice: Subject to any disclaimer, the term of this patent is extended or adjusted under 35 U.S.C. 154(b) by 211 days.

(21) Appl. No.: 14/134,320

(22) Filed: Dec. 19, 2013

(65) Prior Publication Data

US 2014/0180827 A1 Jun. 26, 2014

Related U.S. Application Data

(60) Provisional application No. 61/745,036, filed on Dec. 21, 2012.

(51) Int. Cl.
*G06Q 30/02* (2012.01)

(52) U.S. Cl.
CPC .................. *G06Q 30/0269* (2013.01)

(58) Field of Classification Search
None
See application file for complete search history.

(56) References Cited

U.S. PATENT DOCUMENTS

| | | | | |
|---|---|---|---|---|
| 6,487,538 B1 * | 11/2002 | Gupta | ............... | G06Q 30/02 705/14.66 |
| 2007/0250390 A1 * | 10/2007 | Lee | ............... | G06Q 30/02 705/14.51 |
| 2008/0046920 A1 * | 2/2008 | Bill | ............... | G06Q 30/02 725/34 |
| 2008/0288342 A1 * | 11/2008 | Ingleshwar | ............... | G06Q 30/02 705/14.54 |
| 2010/0145777 A1 * | 6/2010 | Ghosh | ............... | G06Q 30/02 705/14.1 |
| 2010/0223119 A1 * | 9/2010 | Klish | ............... | G06Q 10/00 705/14.26 |
| 2010/0262472 A1 * | 10/2010 | Gautam | ............... | H04L 63/0227 705/14.1 |
| 2010/0299226 A1 * | 11/2010 | Steelberg | ............... | G06Q 30/02 705/27.1 |
| 2011/0040586 A1 * | 2/2011 | Murray | ............... | G06Q 30/02 705/14.49 |
| 2011/0093320 A1 * | 4/2011 | Blake | ............... | G06Q 30/02 705/14.16 |
| 2011/0258042 A1 * | 10/2011 | Purvy | ............... | G06Q 30/02 705/14.49 |
| 2012/0116885 A1 * | 5/2012 | Krishnamoorthy | ............... | G06Q 30/0267 705/14.64 |

(Continued)

OTHER PUBLICATIONS

'Targeted disadvertising'. The Null Device [online]. Archived at the Internet Archive on Aug. 11, 2011. [Retrieved on Jan. 15, 2016] Retrieved from the internet: <URL:https://web.archive.org/web/20110811115106/http://dev.null.org/blog/item/201009211817_targeted_disadvertis>.*

*Primary Examiner* — Bion A Shelden

(57) ABSTRACT

A method and computer-readable medium for carrying out a promotional campaign, comprising: identifying at least one influencer of at least one target of the promotional campaign; identifying at least one indicator of association between the influencer and a brand associated with the promotional campaign; and releasing towards the target a data element derived from the indicator of association.

25 Claims, 11 Drawing Sheets

(56) References Cited

U.S. PATENT DOCUMENTS

| | | | |
|---|---|---|---|
| 2012/0158501 A1* | 6/2012 | Zhang | G06Q 30/0255; 705/14.53 |
| 2012/0166274 A1* | 6/2012 | Krishnamoorthy | G06Q 30/0251; 705/14.49 |
| 2012/0232998 A1* | 9/2012 | Schoen | G06Q 10/10; 705/14.66 |
| 2012/0303468 A1* | 11/2012 | Elyada | G06Q 30/0241; 705/14.73 |
| 2013/0031173 A1* | 1/2013 | Deng | G06Q 30/02; 709/204 |
| 2013/0054638 A1* | 2/2013 | Kim | G06F 17/30616; 707/769 |
| 2013/0117107 A1* | 5/2013 | Evans | G06Q 30/0276; 705/14.53 |
| 2013/0254283 A1* | 9/2013 | Garcia-Martinez | G06Q 50/01; 709/204 |
| 2013/0332436 A1* | 12/2013 | Camplejohn | G06F 17/30867; 707/706 |
| 2014/0089048 A1* | 3/2014 | Bruich | G06Q 30/0201; 705/7.32 |
| 2014/0122501 A1* | 5/2014 | Shen | G06Q 10/10; 707/748 |
| 2014/0122585 A1* | 5/2014 | DeLong | H04W 4/21; 709/204 |
| 2014/0136332 A1* | 5/2014 | Amit | G06Q 30/0269; 705/14.66 |
| 2014/0149503 A1* | 5/2014 | Bosworth | G06Q 30/0255; 709/204 |
| 2014/0156417 A1* | 6/2014 | Biswas | G06Q 50/01; 705/14.66 |
| 2015/0127565 A1* | 5/2015 | Chevalier | G06Q 10/00; 705/319 |
| 2015/0142555 A1* | 5/2015 | Zheng | G06Q 30/0241; 705/14.43 |

\* cited by examiner

METHODS AND COMPUTER-READABLE MEDIA FOR CARRYING OUT PROMOTIONAL CAMPAIGNS

CROSS-REFERENCE TO RELATED APPLICATION

The present application claims the benefit under 35 USC § 119(e) of U.S. Provisional Patent Application Ser. No. 61/745,036, filed Dec. 21, 2012, hereby incorporated by reference herein.

FIELD OF THE INVENTION

The present invention relates to advertising solutions that may be implemented by a mobile network operator (MNO), Internet service provider (ISP) or other service provider when carrying out a promotional campaign.

BACKGROUND

In a mobile network, the operator of the mobile network (MNO) has the ability to transmit targeted messages to its subscribers at any time. Internet Service Providers (ISPs) have a similar facility. If these messages carry advertisements, the MNO or ISP can reach individual subscribers or groups of subscribers during an advertising campaign in a way that is unmatched by traditional media such as television, newspapers, billboards or even online.

However, the mechanism of sending advertisements must be used sparingly, which makes advertising campaigns challenging to craft. In particular, service providers (such as MNOs and ISPs) are cognizant of the annoyance that could be caused to individual subscribers by the transmission or display of too many advertisements. In addition, excessive advertising is likely to have a negative effect on a subscriber's perception of the brand being advertised. Thus, while seeking to maximize its revenues from increased advertising, there will be a trade off in terms of the volume and frequency with which a service provider can expose its subscribers to advertisements before negative effects are triggered.

Against this background, MNOs, ISPs and other service providers would welcome a new solution.

SUMMARY OF THE INVENTION

According to a first broad aspect, the present invention seeks to provide a method for carrying out a promotional campaign, comprising: identifying at least one influencer of at least one target of the promotional campaign; identifying at least one indicator of association between the influencer and a brand associated with the promotional campaign; and releasing towards the target a data element derived from the indicator of association.

According to a second broad aspect, the present invention seeks to provide a computer-readable storage medium storing computer-readable instructions which, when executed by a computing entity, cause the computing entity to implement a method of carrying out a promotional campaign, the method comprising: identifying at least one influencer of at least one target of the promotional campaign; identifying at least one indicator of association between the influencer and a brand associated with the promotional campaign; and releasing towards the target a data element derived from the indicator of association.

According to a third broad aspect, the present invention seeks to provide a method for carrying out a promotional campaign, comprising: identifying an indicator of association between at least one entity an a brand associated with the promotional campaign, the at least one entity being a potential influencer of at least one target of the promotional campaign; identifying a target for which at least one of the at least one potential influencer is an actual influencer of the target; and releasing towards the target a data element derived from the indicator of association between the actual influencer and the brand associated with the promotional campaign.

According to a fourth broad aspect, the present invention seeks to provide a computer-readable storage medium storing computer-readable instructions which, when executed by a computing entity, cause the computing entity to implement a method of carrying out a promotional campaign, the method comprising: identifying an indicator of association between at least one entity an a brand associated with the promotional campaign, the at least one entity being a potential influencer of at least one target of the promotional campaign; identifying a target for which at least one of the at least one potential influencer is an actual influencer of the target; and releasing towards the target a data element derived from the indicator of association between the actual influencer and the brand associated with the promotional campaign.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
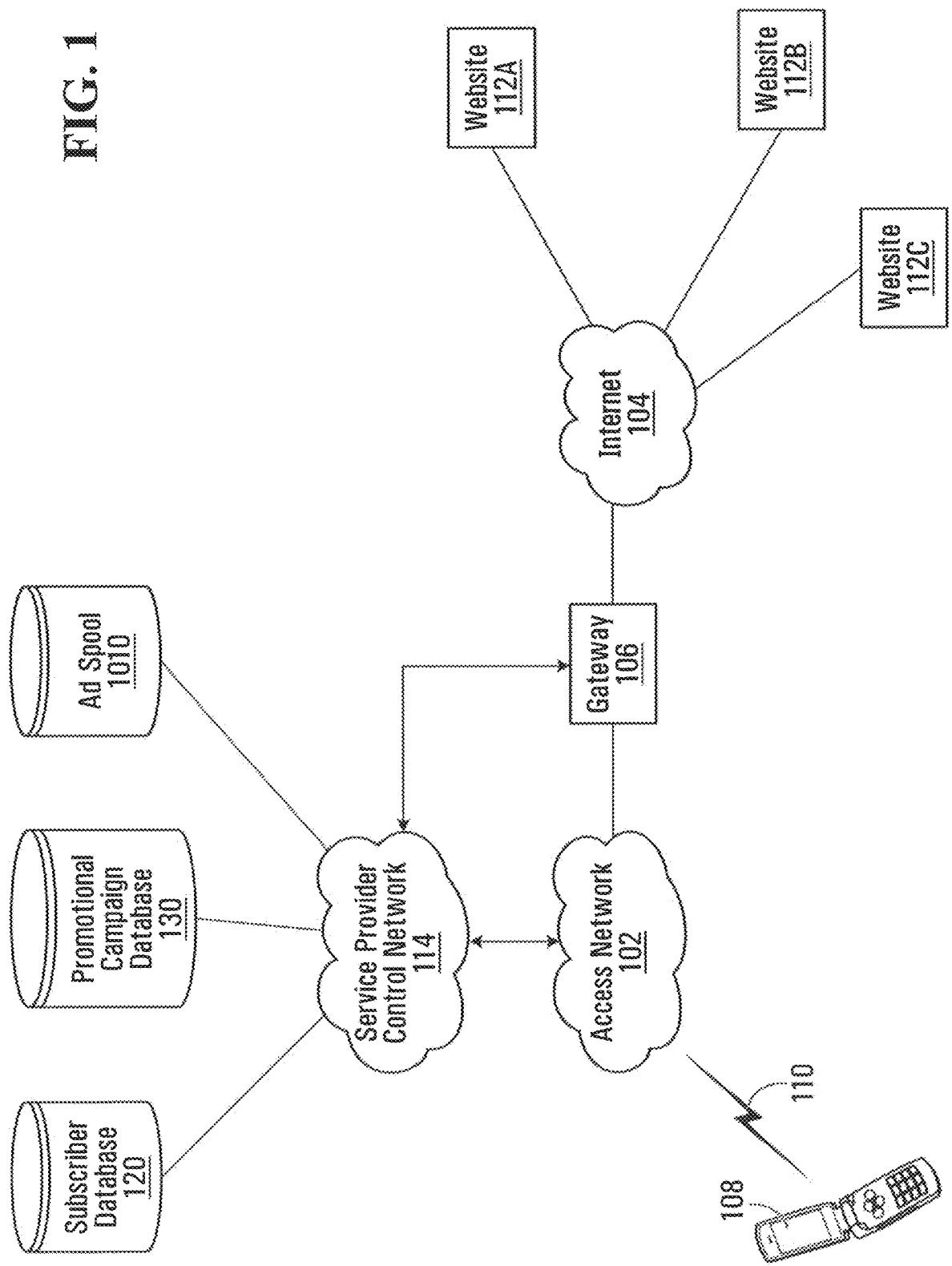
FIG. 1 is a block diagram of a network architecture that supports a method for advertising, in accordance with specific non-limiting embodiments of the present invention.

With reference to FIG. 1, there is shown a network architecture that supports a method for advertising, in accordance with specific non-limiting embodiments of the present invention. The network architecture includes an access network 102 connected to a data network 104 via a gateway 106. In a non-limiting embodiment, the data network 104 may comprise a section of the global network of interconnected computers and domain name servers known as the Internet. A large number of computers, known as websites, are connected to the Internet, and each is associated with an IP address where that website can be reached, as well as a unique alphanumeric name. FIG. 1 shows three websites 112A, 112B, 112C by way of non-limiting example.

The access network 102 can comprise an arrangement of routers, switches, multiplexers, base stations, base station controllers and/or other equipment. The access network 102 allows the delivery of telecommunications services to user devices. An example user device is indicated at 108. In this example, the user device 108 is a mobile device (such as a smartphone, tablet, etc.), which communicates with the access network 102 over a wireless link 110 using a wireless communications protocol. Other user devices connected to the access network 102 need not be mobile devices. For example they may be home gateways, set-top boxes, computers, game consoles or other equipment.

The equipment in the access network 102 is controlled by a service provider control network 114. The service provider control network 114 comprises one or more computing entities (e.g., computers, mainframes, servers) that are under the control of a commercial entity known as a service provider. The service provider has a relationship with a plurality of subscribers. A subscriber can be viewed as an entity (e.g., a person or company) having an account to which is registered a user device or a plurality of user devices. The subscriber is charged (on a post-paid or pre-paid basis) by the service provider for services (such as telecommunications services) that are made available to its registered user device(s) when it(they) is(are) connected to the access network 102. In some embodiments, the service provider may be a mobile network operator (MNO), while in other embodiments, the service provider may be an Internet Service Provider (ISP).

Figure 2:
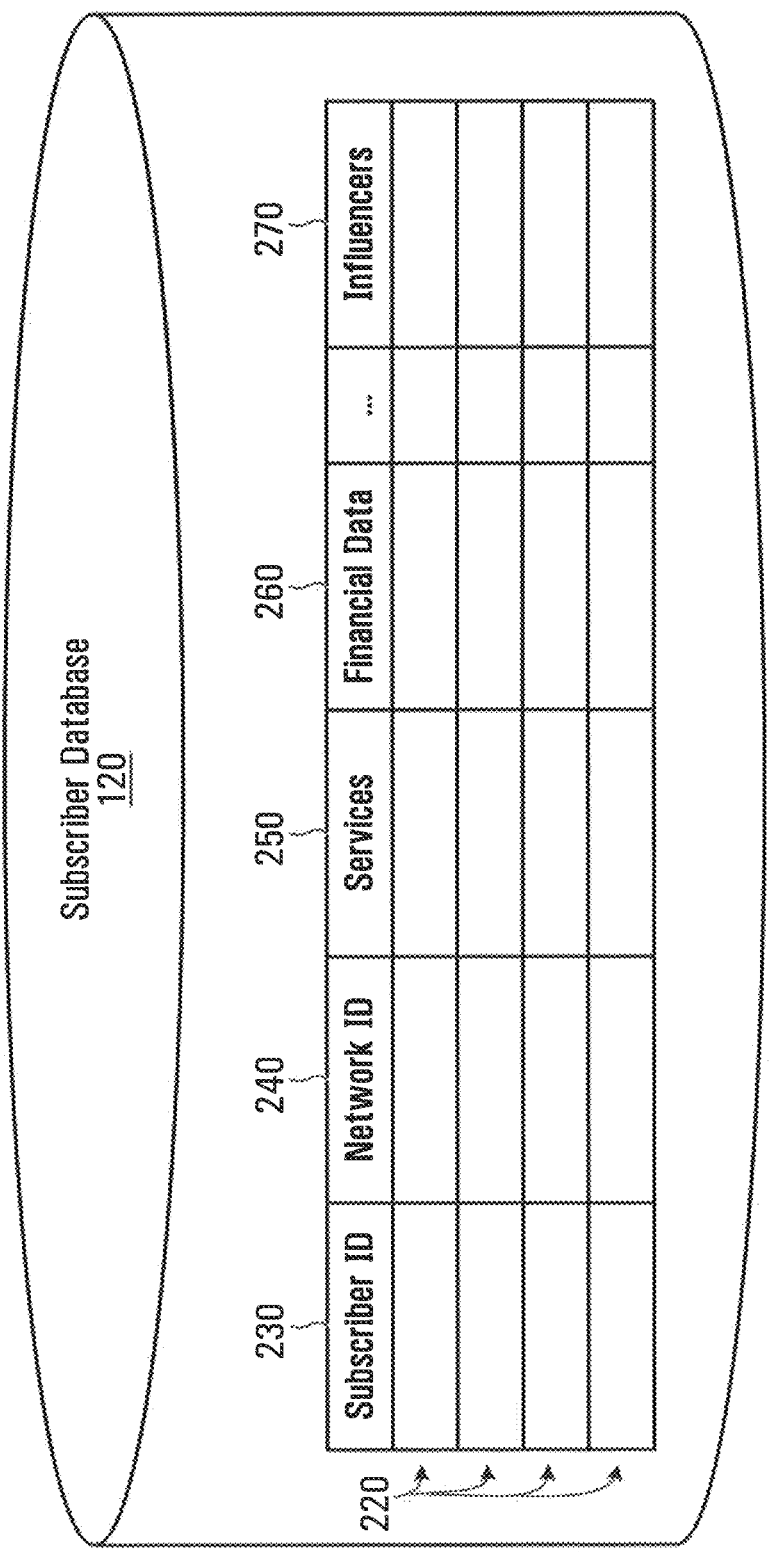
FIG. 2 shows an example of a subscriber database in accordance with a specific non-limiting embodiment of the present invention.

The information regarding the subscribers can be maintained in a subscriber database 120. FIG. 2 shows an example of the subscriber database 120 in accordance with a specific non-limiting embodiment of the present invention. The subscriber database 120 may be tangibly stored in a memory medium. For the purposes of simplifying the present description, the subscriber database 120 is conceptually illustrated as a table comprising a plurality of rows 220, each of which pertains to a particular subscriber. Each row includes a "subscriber ID" field 230, a "network ID" field 240, a "services" field 250 and a "financial data" field 260.

The "subscriber ID" field 230 in a given row may include information that uniquely identifies a particular subscriber. This may include the name, address or other identifier of an individual or company. The "network ID" field 240 in the row corresponding to a particular subscriber may include an identifier of a user device registered to that subscriber. For example, where the user device is a mobile phone, the "network ID" field 240 may store a serial number of the mobile phone. In another example, the "network ID" field may 240 store a telephone number assigned to the mobile phone. In yet another example, the "network ID" field 240 may store an IP address of a device registered to the subscriber. It should be appreciated that more than one user device may be registered to a particular subscriber, and therefore more than one of the rows 220 may be associated with the particular subscriber.

The "services" field 250 in the row corresponding to a particular subscriber includes a list of services (such as telecommunications services) that are available to that subscriber. Examples of services can include the ability to place or receive voice calls (including features such as call waiting, call display, etc.), the ability to transmit or receive text messages, instant messages or MMS messages, the ability to watch television and/or movies on the user device 108, the ability to access network-based PVR services (e.g., television show recording), the ability to play online games (including video games and gambling), the ability to access the Internet 104, in addition to possibly other services.

The "financial data" field 260 in the row corresponding to a particular subscriber includes information that can be used to charge the subscriber. For example, this may include banking information and/or credit card information from which monthly debits are made. If the billing method is invoicing, then the "financial data" 260 field may be empty or it may include a billing address of the subscriber. Other fields may also be included in each row 220, including an "influencers" field 270, which will be described in further detail later on.

The fee that the service provider charges to a subscriber may depend on the services used, as well as on the frequency and/or duration and/or time of use of those services. To this end, the service provider control network 114 monitors and/or controls activity of the equipment in the access network 102 as it pertains to the user device(s) registered to the subscriber. For example, equipment in the access network 102 may send reports to the service provider control network 114. This can be done periodically or in an event-driven manner or upon request by the service provider control network 114. For example, a report that pertains to the user device 108 may indicate actions performed via the user device 108, such as when a text message was read, the identity of a dialed telephone number, the duration of connectivity to the Internet 104 or the number of bytes uploaded and downloaded, to name a few non-limiting possibilities. In addition, the service provider control network 114 may instruct the equipment in the access network 102 to carry out filtering on, or inspection of, data being sent to or from the user device 108 via the gateway 104. Such inspection may yield detailed reports indicative of the keystrokes typed, websites accessed, search queries made and the content of individual text or email messages, to name a few non-limiting possibilities.

Figure 5:
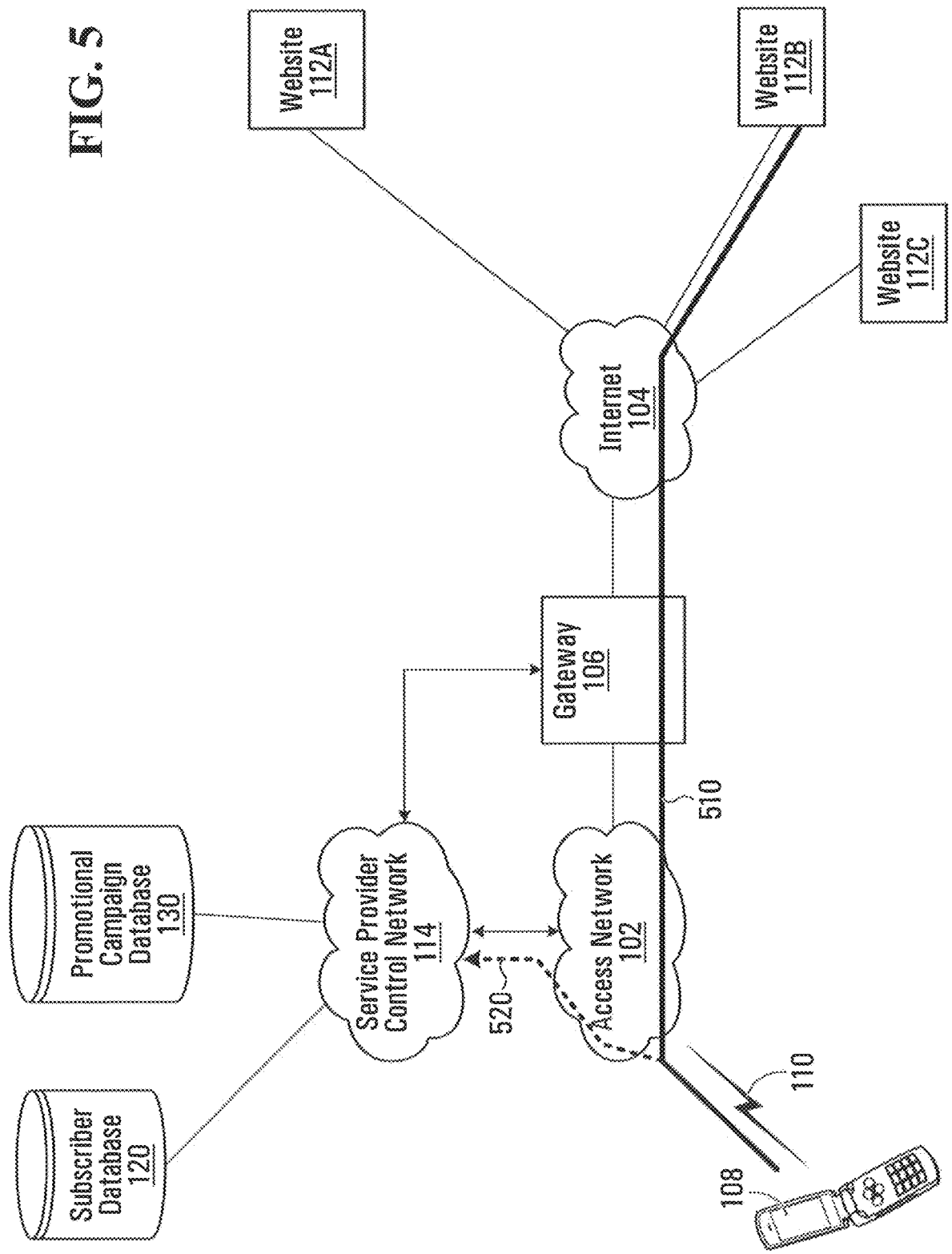
FIG. 5 shows an example connection established between a user device and a website.

By way of illustration, FIG. 5 shows an example connection 510 established between the user device 108 and website 112B. The connection 150 traverses the access network 102, the gateway 106 and the internet 104. Establishment of the connection 510 may be authorized by the service provider control network 114 based on a variety of factors, such as subscriber information related to the user device 108 and the associated service subscriptions, credit rating, parental controls, etc. Equipment in the access network 102 sends messages containing reports over a control link 520 with the service provider network 114. In this way, activities of the subscriber can be monitored based on activities conducted via the user device 108. In this way, the service provider can be apprised of the activities of the subscriber, including, for example, which website pages were accessed, what search queries were made, and so on.

The aforementioned reports may be useful in populating the "influencers" field 270 of the subscriber database 120, as will now be described. Specifically, in one embodiment, an "influencer" of a given subscriber can be viewed as an individual or entity that the given subscriber approves of, trusts or respects. Along the same lines, an "influencer" of a given subscriber can be viewed as an individual or entity that the given subscriber "follows", "friends", is connected to, etc. This relationship of approval can be inferred from actions of the given subscriber, as will now be described.

For example, in the event that the given subscriber routinely reads a blog by Martha Stewart, Martha Stewart may be deemed to be an influencer of the given subscriber. Assuming that the given subscriber is a user of the user device 108, the fact that the given subscriber is indeed accessing Martha Stewart's blog can be determined from reports gathered by equipment in the access network 102, which may include information such as the websites accessed by the user device 108 and/or the keystrokes made by the user of user device 108.

Similarly, if the given subscriber follows Sergey Brin on a micro-blogging site (e.g., a Twitter account purportedly attributed to Sergey Brin), then Sergey Brin may be deemed to be an influencer of the given subscriber.

Likewise, if the given subscriber is "friends with" or "connected to" Shawn Johnson via a social network (e.g., a Facebook page purported to represent Shawn Johnson), then Shawn Johnson may be deemed to be an influencer of the given subscriber.

Alternatively or in addition, elements of the service provider control network 114 may access a list of contacts of the subscriber in order to help populate the "influencers" field 270 pertaining to the subscriber. Such a list of contacts may be stored by the service provider or by the user device 108 or hosted by a web site (such as www.gmail.com). The service provider may make the default assumption that individuals or organizations listed in the contacts of the subscriber are trusted and therefore qualify as influencers. A further degree of certainty regarding whether a contact is to be deemed an influencer can be gained by processing the content of messages (e.g., email messages and text messages) sent to or received from that contact.

It should be understood that the information stored in the "influencers" field 270 may comprise, for a given influencer that is a person or organization, an identifier of that person or organization. The identifier may comprise one or more of a name as used in real life, a pseudonym, a stage name, a screen name, a username, etc. Additional information may also be stored such as an address (such as an email address or an IP address), an account identifier, etc., any or all of which may be used to disambiguate the influencer and/or locate him/her/it online, among other possible uses.

In addition to monitoring the activities of the subscriber via the user device 108, the service provider control network 114 may also control or affect what is displayed on the user device 108 during the connection 510.

For example, consider that the user device 108 is a mobile terminal with a background screen. Certain elements appearing on the background screen may be controlled by the service provider control network 114 and can be referred to as service provider control elements. The service provider control elements may include graphics, text, links, icons, banners, etc. The service provider control elements may be actionable, e.g., their selection by the user of the user device 108 may cause instantiation of an application on the user device 108.

In another example, consider that the user device 108 instantiates a web browser on the user device 108. The web browser includes one or more browser windows via which Internet navigation occurs. One or more portions of one or more browser windows may be controlled by the service provider control network 114 and can be referred to as service provider control portions. A service provider control portion may include images, text or hyperlinks, to name a few non-limiting possibilities. In the case where the browser window displays a list of search results, a service provider control portion may appear as an extension to the list of search results. In some embodiments, a service provider control portion may also be a separate browser window or a frame of a browser window.

In some embodiments of the present invention, an advertising campaign (also referred to as a promotional exercise, marketing effort, etc.) may be set up by the service provider on behalf of the advertiser. The advertising campaign may serve to promote one or more "brands". The general term "brand" is used herein to refer to one or more of: a trademark for goods, the name of a store, an event, a provider of a service, a political party, a television network, etc. For the purposes of certain embodiments of the present invention, a brand may, but need not, be a trademark.

The advertising campaign may define the terms under which the service provider will promote the brand to its subscribers, as well as the fee that will be paid to the service provider for doing so.

Figure 3:
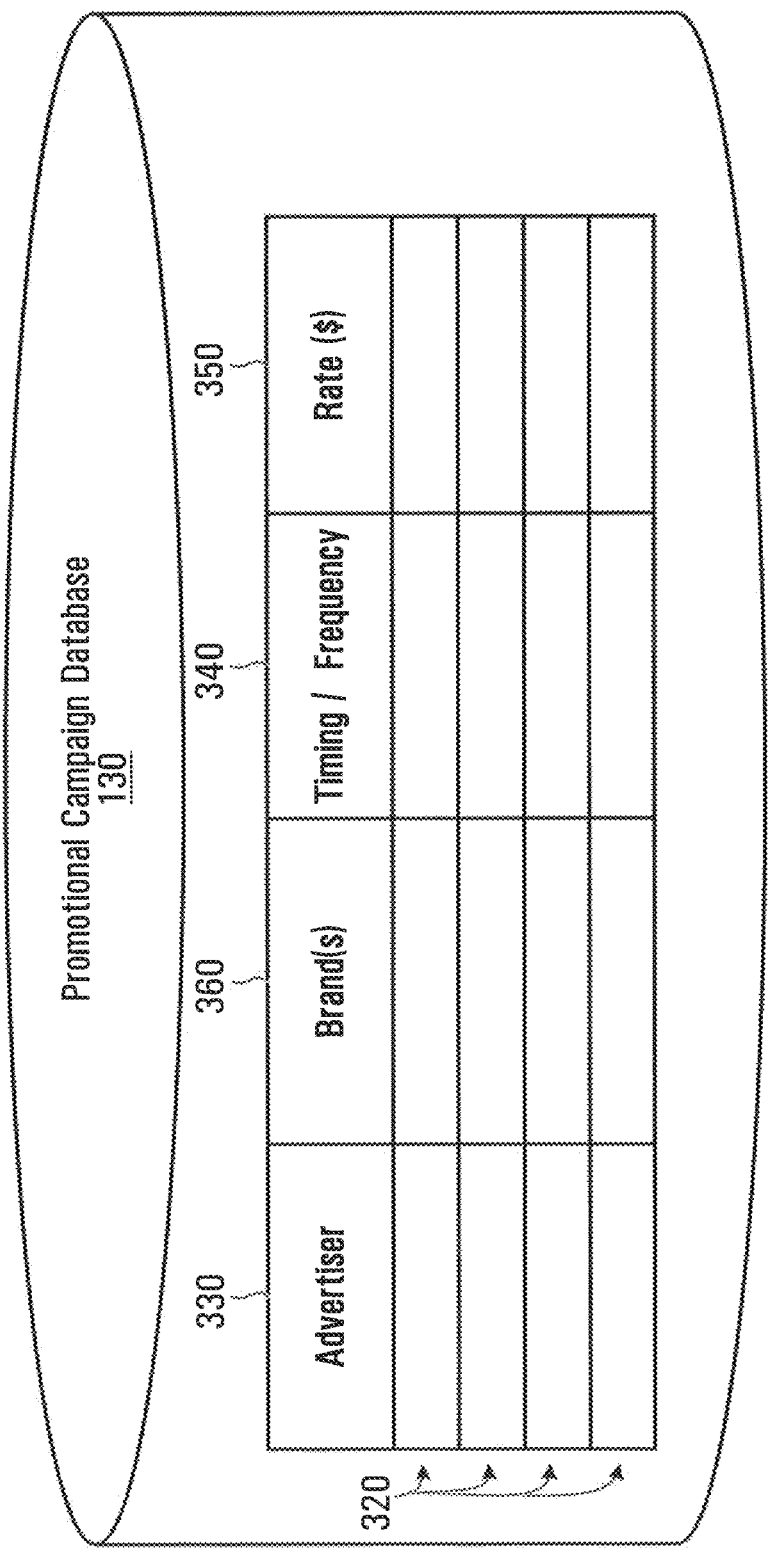
FIG. 3 shows an example of a promotional campaign database in accordance with a specific non-limiting embodiment of the present invention.

For example, the promotional campaign may be defined by information such as that shown in FIG. 3, which illustrates a promotional campaign database 130. The promotional campaign database 130 may be tangibly stored in a memory medium. The promotional campaign database 130 is conceptually shown as a table comprising a plurality of rows 320 associated with respective advertisers who have set up promotional campaigns with the service provider. The advertisers are identified in an "advertiser" field 330. Each of the rows 320 additionally includes an "ad timing and frequency" field 340, a "rate" field 350 and a "brand(s)" field 360. Of course, the promotional campaign database 130 need not be constructed as illustrated in FIG. 3. In particular, it should be understood that some fields may be omitted, while others may be added.

The contents of the "brand(s)" field 360 may identify a specific trademark, logo, service name, event or location (to name a few non-limiting possibilities) associated with the advertiser. The information appearing in the "ad timing and frequency" field 340 may specify certain parameters regarding the advertising campaign, such as how long the campaign will last, the timing of individual advertisements, limits on the maximum and/or minimum number of ads per subscriber per day, and so on. Finally, the "rate" field 350 may include information on how the service provider is to be compensated by the advertiser, such as on a daily or per-advertisement basis, or based on the campaign success (penetration) rate.

Additionally, an ad spool 1010 holds data elements that are to be sent to individual subscribers in the context of the various promotional campaigns. The ad spool 1010 may be implemented in the form of a database, server or other computing entity, which is accessible to the entities in the service provider control network 114. A description of how the data elements in the ad spool 1010 may be created will be provided later on.

An effective promotional campaign will result in advertisements that reach an audience likely to be influenced by its advertisements. Since it is neither feasible nor desirable to constantly flood subscribers with advertisements, the service provider has an interest in finding an effective way to reach subscribers that are most likely to be influenced by a particular advertisement.

Accordingly, a first embodiment of an advertising method of the present invention provides for the identification of certain key individuals that are likely to influence the service provider's subscribers, and then determining which of those individuals are associated with the brand to be promoted. A second embodiment of an advertising method of the present invention provides for the identification of individuals that are associated with the brand to be promoted, and then identifying subscribers who are likely to be influenced by those individuals. Each of the two aforementioned non-limiting embodiments will be described in some detail herein below.

First Embodiment of Advertising Method

A first non-limiting embodiment of an advertisement method of the present invention is now described in further detail with reference to the flowchart in FIG. 4A, which includes steps 410 through 450 that can be executed by one or more computing devices (e.g., servers) in the service provider control network 114. It is assumed that a promotional campaign has been established for a particular advertiser and that the appropriate fields of the promotional campaign database 130 have been populated.

At step 410, a brand associated with the promotional campaign is identified. To this end, a server executing the method may access the promotional campaign database 130 and read the contents of the "brand(s)" field 360 therein. In a specific non-limiting embodiment, the brand may represent a trademark for goods (car, camera, laundry detergent, smartphone, appliance, beverage, etc.), the name of a store (retail, wholesale, distribution, online, etc.), a place (country, city, neighborhood, tourist destination, etc.), an event (jazz festival, museum exhibit, movie, blood drive, etc.), a provider of a service (restaurant, hotel, moving company, hair salon, cross-border logistics provider, accounting firm, airline, etc.), a political party, a radio station, and so on. It should also be appreciated that the brand may be textual and/or graphics-based and/or shape-based. While a brand may be a trademark, this is not a requirement of the present invention.

At step 420, the server executing the method identifies a target subscriber for the promotional campaign. This could be achieved by identifying, as the target subscriber, any given subscriber in the subscriber database 120 (e.g., the row 220 having the least significant value in the "subscriber ID" field 230, etc.). This could also be achieved by identifying, as the target subscriber, a particular subscriber in the subscriber database meeting certain predefined criteria associated with the promotional campaign. For example, in some cases, the promotional campaign may be limited to a certain demographic, for example males between the ages of 18 and 35. The fact that a promotional campaign may be limited to such a demographic could be specified in a field (not shown in FIG. 3) of the promotional campaign database 130. Then, the fact that a particular subscriber falls within that demographic might be apparent from reading a field (such as an "age" field, not shown in FIG. 2) for that particular subscriber's row in the subscriber database 120. Other demographics may be used to tailor other promotional campaigns. In still other cases, there is no demographic facet to the promotional campaign, and thus all subscribers in the subscriber database 120 are considered to be potential target subscribers for the promotional campaign. When there are plural target subscribers, the remaining steps of the method (steps 430 through 450) may be repeated for some or all of the target subscribers, either sequentially or in parallel.

At step 430, the server executing the method identifies one or more influencers of the target subscriber that was identified at step 420. This information can be obtained by consulting the "influencers" field 270 in the appropriate row 220 of the subscriber database 120 corresponding to the target subscriber. The content of the "influencers" field 270 may be the name of an individual or corporation, to name two non-limiting possibilities. When there are plural influencers for the target subscriber, the remaining steps of the method (steps 440 and 450) may be repeated for each of these influencers of the target subscriber.

At step 440, the server executing the method determines one or more indicators of association between the influencer identified at step 430 and the brand identified at step 410. In one embodiment, the indicator of association between the influencer and the brand can refer to evidence (either textual, photographic, audio, etc.) that there is an endorsement of the brand by the influencer. In another embodiment, the indicator of association between the influencer and the brand can refer to material showing that there is a positive association between the influencer and the brand. In another embodiment, the indicator of association between the influencer and the brand can refer to material which, when perceived by a subscriber, is likely to leave the subscriber with an impression or conclusion that the influencer has a favorable view of the brand.

Thus, an indicator of association between the influencer and the brand may be manifested in the form of material on the Internet, including but not limited to an image, video, article, tweet, blog post, comment, bibliographic citation and so on.

In order to determine the one or more indicators of association between the influencer and the brand, the server executing the method may conduct a search, such as an Internet search.

In accordance with one non-limiting embodiment, the search performed at step 440 may include visiting a public section of a social media site purported to represent the influencer. Images, messages, comments, tweets and other data elements are analyzed by the server executing the method, and those which establish a link between the influencer and the brand can be recorded as the one or more indicators of association.

Figure 6:
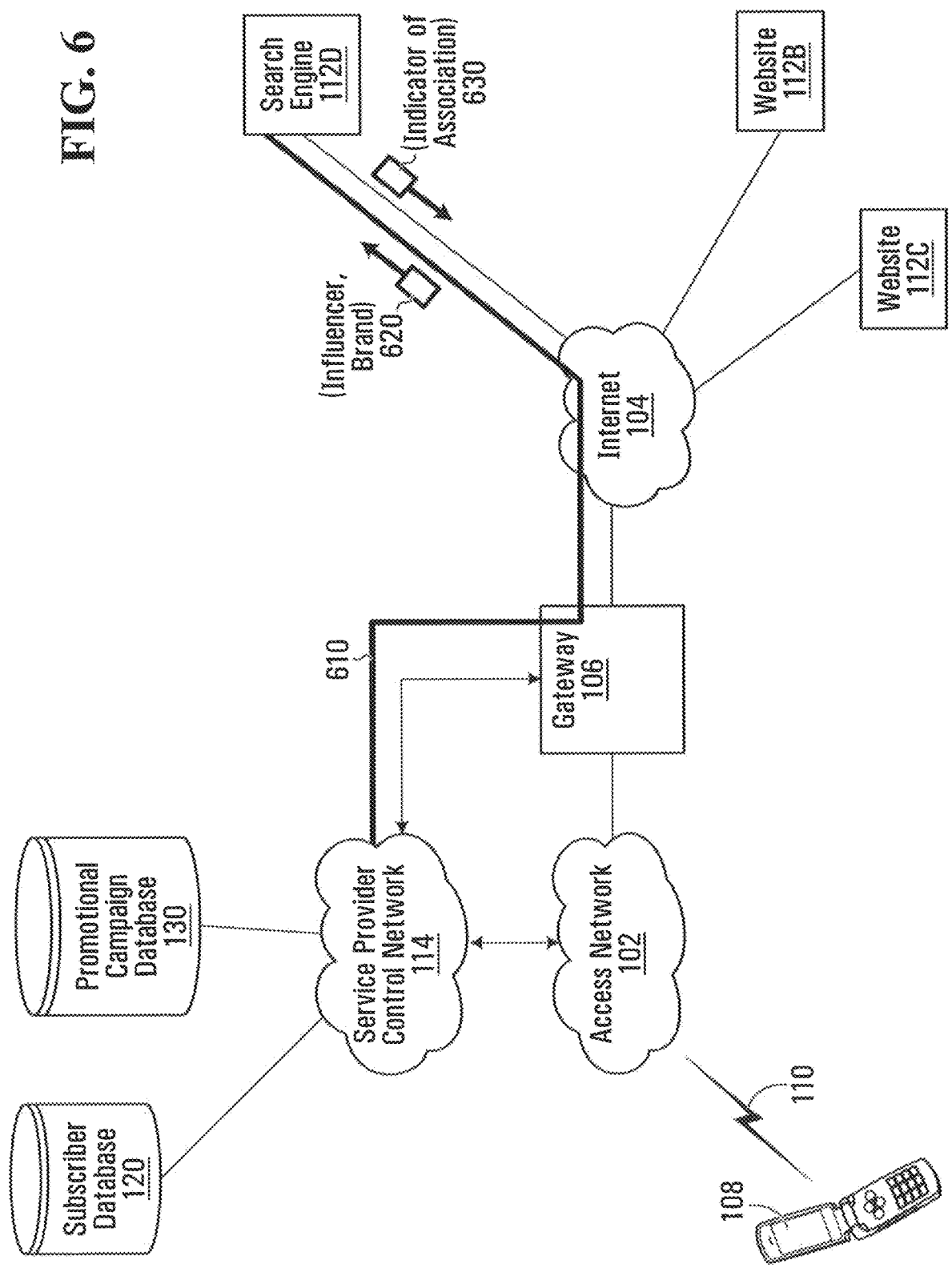
FIG. 6 shows an example connection established between a service provider control network and a search engine website.

In accordance with another non-limiting embodiment, illustrated in FIG. 6, the search performed at step 440 may involve establishing a connection 610 between the service provider control network 114 and a search engine website 112D (such as www.google.com). A search query 620 supplied to the search engine website 112D can be automatically formulated using a plurality of search terms including the identity of the influencer and the brand. The search engine website 112D returns one or more search results 630, which may be arranged in a list of Internet hyperlinks. Additional search terms (such as "enjoys", "likes", "uses", "shops at") may also be submitted as part of the search query 620 in order increase the probability that the results will be reflective of a positive association between the influencer and the brand. The search results 630 may already be ranked by the search engine website 112D, or they can be processed and ranked by server that is executing the method. For instance, processing may involve filtering the search results to keep only those that portray a favorable link between the influencer and the brand, as evaluated by the presence of positive visual or textual cues.

At step 450, the server formulates a data element for the target subscriber and may store it in the ad spool 1010. The data element can be derived from the indicator of association that was determined at step 440. In some embodiments, the data element may comprise the indicator of association (e.g., image, article, hyperlink, etc.). In other embodiments, the data element may be a distillation or summary of the content of the indicator of association. Still other possibilities for deriving a transmittable data element from an indicator of association will now be apparent to those of skill in the art.

Figure 10:
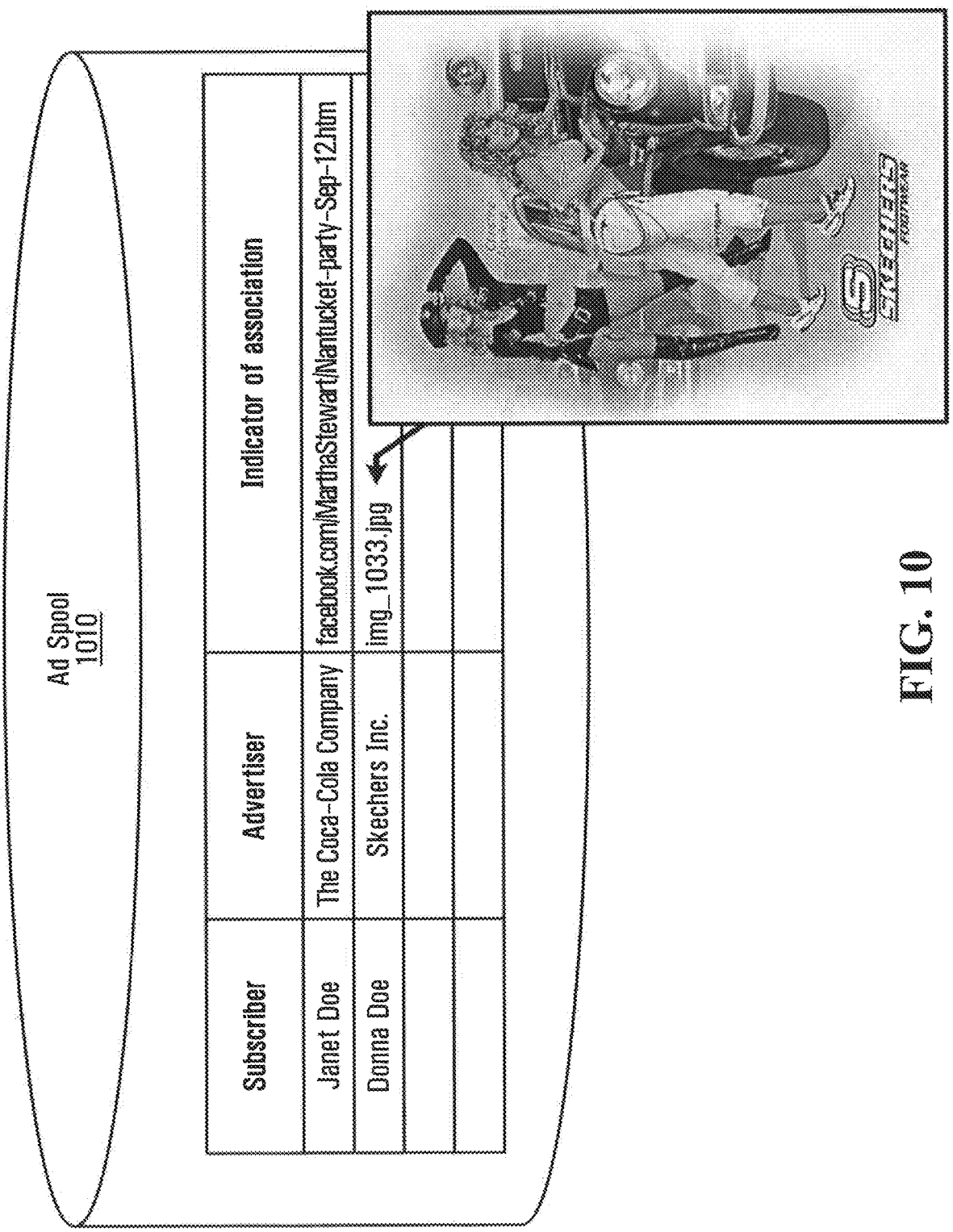
FIG. 10 shows an example of an ad spool in accordance with a specific non-limiting embodiment of the present invention.

As a first example, assume that the advertiser is the Coca-Cola company. Assume also that the brand being promoted is CocaCola™ (by way of an example of step 410) and that a target subscriber is a certain Janet Doe (by way of an example of step 420). Assume further than an influencer of Janet Doe has been found to be Martha Stewart (by way of an example of step 430). At this point, execution of step 440 may include accessing a public section of Martha Stewart's Facebook™ page, which may reveal a comment posted on September 12 referring to "delicious CocaCola™ muffins" made in the context of a summer party at her Nantucket summer home. This establishes the existence of a favorable association between Martha Stewart and Coca-Cola™, which may or may not be deliberate on the part of the influencer (Martha Stewart) and/or the advertiser (the Coca-Cola Company). As part of step 450, a data element (e.g., the aforementioned comment, and/or a hyperlink thereto, and/or a summary thereof) may be stored by the server in the ad spool 1010 in association with the target subscriber (Janet Doe) and the advertiser (the Coca Cola Company). In the example illustrated in FIG. 10, the data element is the hyperlink www.facebook.com/MarthaStewart/Nantucket-party-Sep-12.htm, which is stored in the memory of the ad spool 1010.

As a second example, assume that the advertiser is Skechers Inc., a footwear company. Assume also that the brand being promoted is Skechers™ (by way of an example of step 410) and that a target subscriber is a certain Donna Doe (by way of an example of step 420). Assume further that an influencer of Donna Doe has been found to be Christina Aguilera (by way of an example of step 430). At this point, execution of step 440 may include performing a search using the Google™ search engine using the query "Christina Aguilera Skechers", which may reveal images of Christina Aguilera wearing Skechers™ footwear as featured in an article entitled "Christina Aguilera is naughty in Skechers ad campaign", hosted at the website http://adland.tv. As part of step 450, a data element (e.g., the article and/or the images, and/or a hyperlink thereto, and/or a brief message corresponding thereto) may be stored by the server in the ad spool 1010 as being associated with the target subscriber (Donna Doe) and the advertiser (Skechers Inc.). In the example illustrated in FIG. 10, the data element corresponds to one of the images of Christina Aguilera sporting Skechers™ footwear, which is locally stored in the memory of the ad spool 1010 by the server (under filename img_1033.jpg).

As a third example, assume that the advertiser is the Bourbon Street Merchants Association and that the influencer for a particular target subscriber was found to be Louisiana Governor Bobby Jindal. In this case, the brand associated with the advertiser may be "Bourbon Street" (which, it is noted, is a "brand" in the sense of the present disclosure regardless of its actual trademark registrability). Now, assume that a local resident who spotted Bobby Jindal at a bar on Bourbon Street posted this fact on his publicly visible Facebook wall (e.g., in the form of a comment such as "OMG saw Gov. Jindal on Bourbon Street"). In this example, the data element that is stored in the ad spool 1010 may be a derivation of the comment, such as "Gov. Jindal visits French Quarter", which may be accompanied by a link to the comment and possibly a photograph. (In some embodiments, the data element may be approved and/or provided by the advertiser.) It is noted that the data element, although derived from the indication of association, does not mention the brand "Bourbon Street". However, if a subscriber clicks on the link associated with the aforementioned data element, he or she will learn that the Governor was seen on Bourbon Street, which gets the message across on behalf of the Bourbon Street Merchants Association.

The above steps 410-450 can be performed for various target subscribers, influencers and brands, either sequentially or in parallel.

At some point in time, for a given subscriber, one or more servers in the service provider control network 114 and/or the access network 102 proceeds to execute the method shown in the flowchart of FIG. 4B as step 460.

Specifically, the data element that was formulated at step 450 and stored in the ad spool 1010 is conveyed to the given subscriber. The manner and timing with which the data element is conveyed may vary greatly from one embodiment to the next. In terms of timing, the service provider control network 114 may issue advertisements according to a schedule or criteria that may be dependent on the content of the promotional campaign database 130. Specifically, the information in the "ad timing and frequency" field 340 can specify and/or limit when and how often to send advertisements to the subscribers, in the context of a particular promotional campaign.

The data element may be conveyed in the form of a targeted message. The nature of the targeted message can vary widely across different embodiments. For the purposes of the below examples, let it be the case that the given subscriber is associated with the user device 108.

Figure 7:
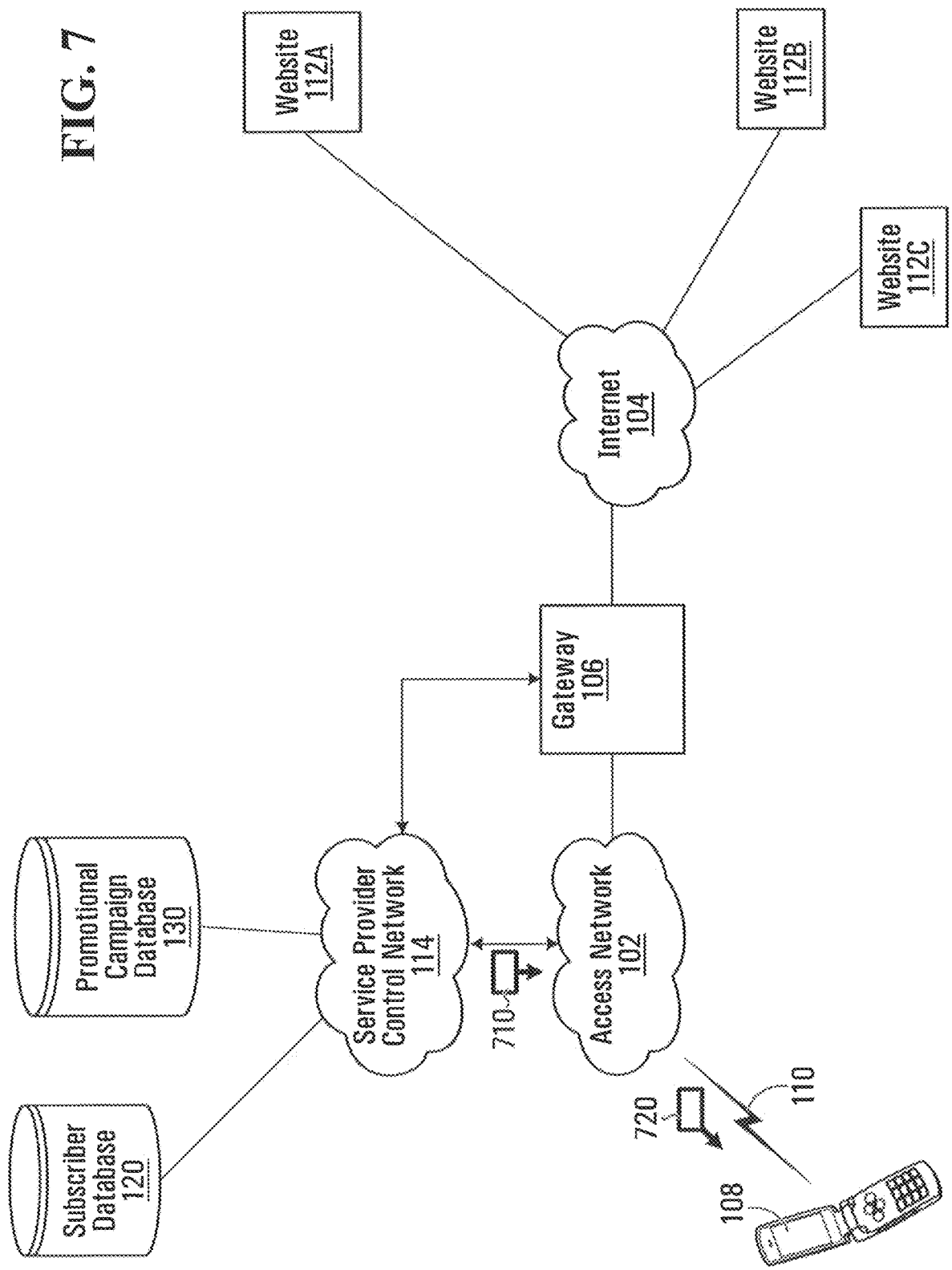
FIG. 7 is a signal flow diagram showing conveyance of a data element from the service provider control network to the user device.

In a first example, the data element can be embedded in a direct-to-subscriber advertisement. Accordingly, the service provider control network 114 may send an email or text message containing the data element to a device address of the user device registered to the given subscriber. By way of non-limiting example, FIG. 7 illustrates the conveyance of a message 710, which may be transformed and/or formatted into a second message 720 as it travels through the access network 102. The message 710, which may be an email or SMS message, conveys the data element to the user device 108. Upon reading the email or SMS message, a user of the user device 108 is exposed to the data element, allowing the user to witness how one of his or her influencers is associated with a particular brand.

In a second example, the data element can be inserted into part of a browser environment that is being viewed by the given subscriber as he or she accesses a certain website on the Internet. This insertion into part of the browser environment can be done "over the top", i.e., without the knowledge, approval or control of the website that is being accessed by the given subscriber. That is to say, part of the browser window real estate is co-opted by the service provider in order to place therein the data element.

Alternatively, the data element can be placed into a portion of the browser window that is reserved for advertisements. This portion may correspond to a service provider toolbar, which may be installed by the subscriber and is integrated into the browser environment (e.g., as a browser plug-in). There may be underlying incentives for the subscriber to have installed the toolbar into the browser. For example, the toolbar may implement a usage meter for monitoring how many bytes are being consumed in the upload/download direction. Alternatively or in addition, the toolbar may implement a convergence service such as an ability to display a name, number or graphical element corresponding to a calling party that is trying to reach the subscriber over another medium (e.g., by dialing the subscriber's telephone number).

In a third example, a letter, pamphlet or brochure containing a printed version of the data element can be sent by post to an address associated with the account of the given subscriber.

In a fourth example, the data element can be delivered over a mobile application that the subscriber has activated or is subscribed to. One such mobile application could be mobile television, which can carry a video stream in which the data element is embedded. The mobile application could be installed (or the video feed could be activated) in response to a subscriber action. For example, consider a poster that is manufactured with a near field communications (NFC) tag. The subscriber with an NFC-enabled phone can walk up into proximity of the poster and download the content of the NEC tag, which can be a URL or other link. The URL or link can then steer the mobile phone to a location on the Internet 104 or in the service provider control network 114 where the application can be downloaded. Targeted messages containing the data element can then be popped up by the application periodically, or it can be inserted into the video content.

It will be appreciated that when there exists more than one indicator of association for a given subscriber, then there may be a corresponding number of data elements formed. Each corresponding data element may be conveyed in a manner similar to what was described above in connection with step 460. Also, the process can be repeatedly carried out for each subscriber.

Generally speaking, the above process has the potential to identify instances where a particular brand appears to be endorsed by someone who has influence over a subscriber. The influencer may or may not be conscious of the fact that he or she appears to endorse the brand. Additionally, the influencer may or may not be conscious of his or her own influence over the subscriber. Meanwhile, the user is deliberately exposed to this endorsement in a targeted but subtle manner, in the hopes (from the advertiser's point of view) of generating increased brand goodwill from the perspective of the subscriber. In a mobility scenario, the user of a device that receives an advertisement is likely to be the subscriber to whom the device is registered, which further increases effectiveness of the advertising campaign.

Second Embodiment of Advertising Method

In a second non-limiting embodiment of an advertisement method of the present invention, certain steps are performed in a different order and in a somewhat different manner, as is now described in further detail with reference to the flowchart in FIG. 8, which includes steps 810 through 840 of a method that can be executed by one or more computing devices (e.g., servers) in the service provider control network 114. Again, it is assumed that a promotional campaign has been established for a particular advertiser and that the appropriate fields of the promotional campaign database 130 have been populated.

At step 810, which is identical to step 410, a brand to be promoted is identified. To this end, a server executing the method may access the promotional campaign database 130 and read the contents of the "brand(s)" field 360 therein. In a specific non-limiting embodiment, the brand may represent a trademark for goods (car, camera, laundry detergent, smartphone, appliance, beverage, etc.), the name of a store (retail, wholesale, distribution, online, etc.), a place (country, city, neighborhood, tourist destination, etc.), an event (jazz festival, museum exhibit, movie, blood drive, etc.), a provider of a service (restaurant, hotel, moving company, hair salon, cross-border logistics provider, accounting firm, airline, etc.), a political party, a radio station, and so on. It should also be appreciated that the brand may be textual and/or graphics-based and/or shape-based. While a brand may be a trademark, this is not a requirement of the present invention.

At step 820, the server executing the method identifies one or more entities that have a favorable association with the brand, as well as indicators of association between those entities and the brand. These entities are referred to as "potential influencers" because, at this stage of the method's execution, the service provider does not yet know whether, or to what extent, any of these entities qualify as actual influencers vis-à-vis certain subscribers.

In one embodiment, the indicator of association between a potential influencer and the brand can refer to evidence (either textual, photographic, audio, etc.) that there is an endorsement of the brand by the potential influencer. In another embodiment, the indicator of association between the potential influencer and the brand can refer to material showing that there is a positive association between the influencer and the brand. In another embodiment, the indicator of association between the potential influencer and the brand can refer to material which, when perceived by a subscriber, is likely to leave the subscriber with an impression or conclusion that the potential influencer has a favorable view of the brand.

By way of non-limiting example, execution of step 820 may involve the server accessing one or more websites or online sources over the Internet, such as social media sites (e.g., Facebook™), micro-blogging sites (e.g., Twitter™), as well as various news sites, special interest sites, corporate sites and general opinion sites, etc. Retrieved images, articles, messages, comments, tweets and other media fragments are analyzed, and those which establish a link between a potential influencer and the brand can be retained by temporarily storing them in a memory as an indicator of association between the potential influencer and the brand.

Who may a priori be considered a potential influencer is not particularly limited. Nevertheless, it may be feasible to restrict the universe of potential influencers in order to reduce the number of indicators of association that need to be temporarily stored. For example, the information gathered may be cross-referenced against a database of potential influencers (not shown), which may be tangibly stored in a memory medium and accessible to the service provider control network 114. In a non-limiting example, the database of potential influencers may include a list of the top 1,000 of 10,000 most followed Twitter™ accounts, a list of the world's most newsworthy individuals, etc.

Figure 9:
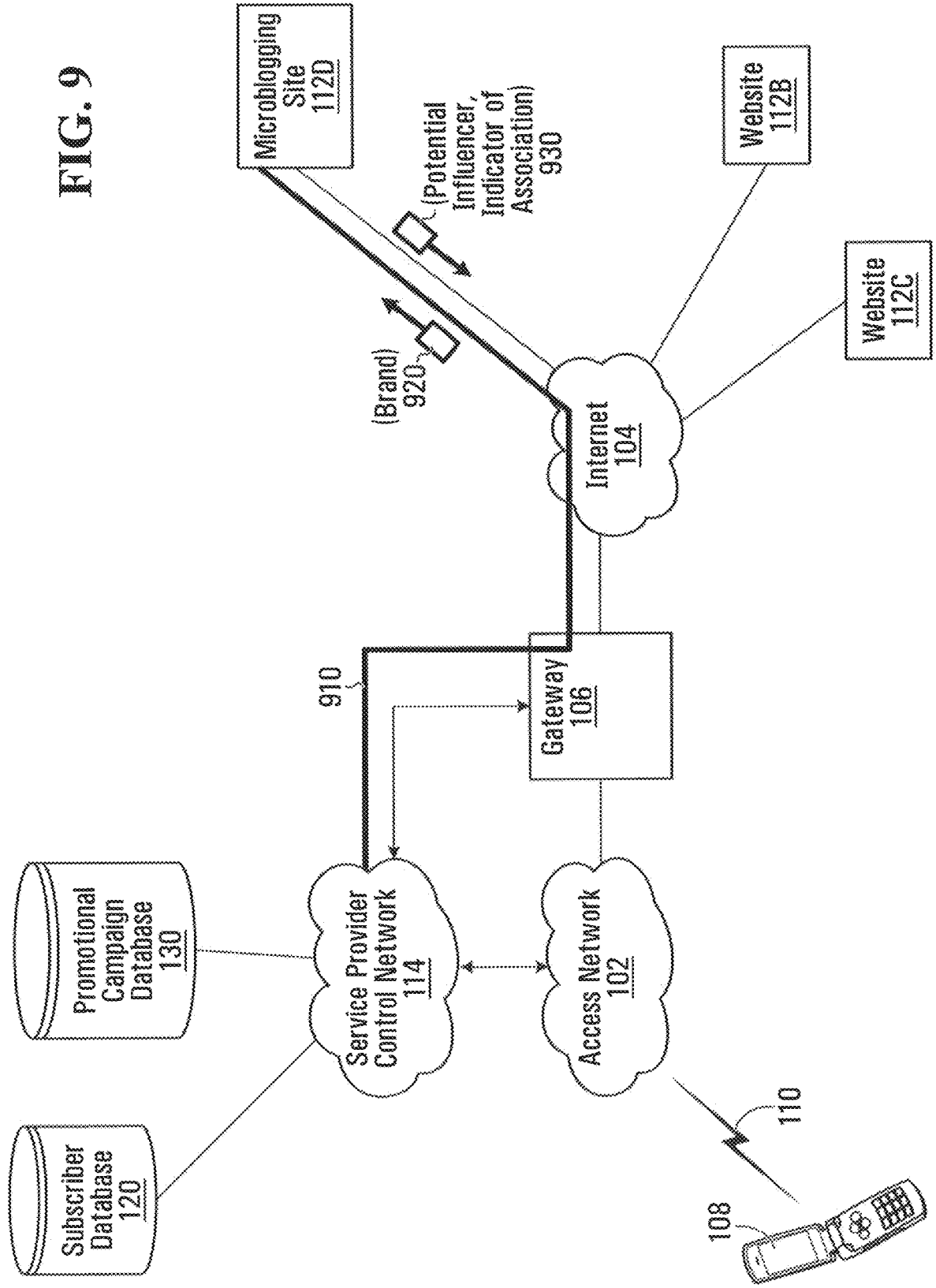
FIG. 9 shows an example connection established between a service provider control network and a micro-blogging site.

One non-limiting example embodiment of step 820 is conceptually illustrated in FIG. 9, wherein a connection 910 is established between a server in the service provider control network 114 and a micro-blogging site 112E (such as www.twitter.com). A query 920 supplied to the micro-blogging site 112E can be automatically formulated using the name of the brand. The micro-blogging site 112E returns a response 930, which may be a list of tweets that refer to the brand. The response 930 may be processed and ranked by server that is executing the method. For example, processing the response 930 may involve identifying the accounts from which the tweets originated, and determining whether these accounts are likely to be representative of potential influencers. (This may also involve a comparison with the database of potential influencers.) In addition, the tweets can be screened to retain those where there is a positive relationship between the Twitter™ account and the brand. As such, step 820 results in identifying (i) potential influencers who have a favorable association with the brand and (ii) indicators of association between those potential influencers and the brand.

At step 830, the server executing the method identifies those subscribers for which one or more of the potential influencers identified at step 820 is an actual influencer. This can be achieved by going through the rows 220 of the subscriber database 120 and consulting the "influencers" field 270 in each row to see whether it includes any of the potential influencers identified above. If the answer is yes for a particular subscriber and a particular influencer, a data element may be stored by the server in the ad spool 1010 in association with the particular subscriber.

At step 840, the server formulates a data element for the particular subscriber identified at step 830 and may store it in the ad spool 1010. The data element can be derived from the indicator of association that was determined at step 820. In some embodiments, the data element may comprise the indicator of association (e.g., image, article, hyperlink, etc.). In other embodiments, the data element may be a condensation or summary of the content of the indicator of association. Still other possibilities for deriving a transmittable data element from an indicator of association will now be apparent to those of skill in the art.

With the ad spool 1010 populated, conveyance of the data element can proceed as previously described with reference to step 460 in FIG. 4B. For example, this can result in the data element being conveyed to a given subscriber in the form of being emailed, texted, tweeted, placed in the background, inserted into a browser window, etc.

Variant

The above examples have considered that the influencer of a subscriber is a person or organization that the subscriber may trust, respect or be attracted to. However, this condition need not hold true, and yet the concepts of the present invention can still be applied.

Specifically, in one embodiment, an "influencer" of a given subscriber can be viewed as an individual or entity that the given subscriber disapproves of, disrespects or mistrusts. By the same token, an "influencer" of a given subscriber can be viewed as an individual or entity that the given subscriber has "unfollowed", "unfriended", disconnected from, etc.

This relationship of disapproval can be inferred from actions of the given subscriber, based on monitoring activity performed by or reported to the service provider control network 114. The influencers that are identified in this manner can be recorded in the "influencers" field 270 of the subscriber database 120, with the understanding that they represent mistrusted influencers rather than trusted influencers.

Figure 11:
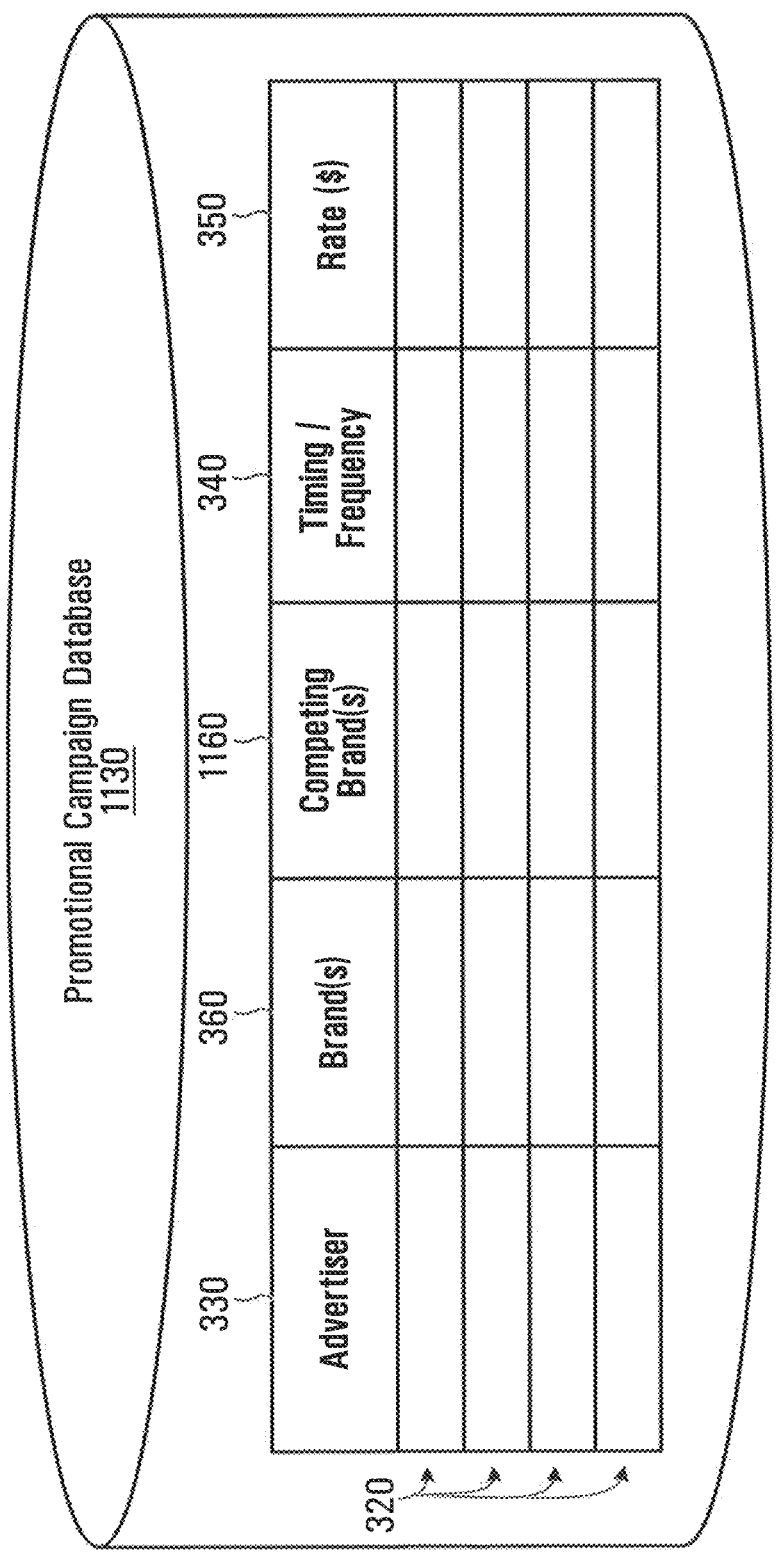
FIG. 11 shows an example of a promotional campaign database in accordance with a specific non-limiting embodiment of the present invention.

In this case, since the influencer is negatively perceived by the subscriber, the advertiser may be interested in influencing the subscriber by pointing to the existence of a positive link between the (mistrusted) influencer and competing brands, i.e., brands that compete with the one that the advertiser is actually trying to promote. To this end, and with reference to FIG. 11, there is provided a promotional campaign database 1130. The promotional campaign database 1130 may be tangibly stored in a memory medium. The promotional campaign database 1130 is conceptually shown as a table comprising a plurality of rows 320 associated with respective advertisers who have set up promotional campaigns with the service provider. The advertisers are identified in an "advertiser" field 330. Each of the rows 320 additionally includes an "ad timing and frequency" field 340, a "rate" field 350 and a "brand(s)" field 360. Of course, the promotional campaign database 1130 need not be constructed as illustrated in FIG. 11. In particular, it should be understood that some fields may be omitted, while others may be added.

In this embodiment, the "brand(s)" field 360 is optional. If it is used, it may identify a specific trademark, logo, service name, event or location associated with the advertiser. The information appearing in the "ad timing and frequency" field 340 may specify certain parameters regarding the advertising campaign, such as how long the campaign will last, the timing of individual advertisements, limits on the maximum and/or minimum number of ads per subscriber per day, and so on. The "rate" field 350 may include information on how the service provider is to be compensated by the advertiser, such as on a daily or per-advertisement basis, or based on the campaign success (penetration) rate.

In addition, the promotional campaign database 1130 includes a "competing brands" field 1160. "competing brands" field 1160 may identify one or more brands that are considered adverse to the original brand. This can include one or more trademarks, logos, service names, events or locations that are associated with competitors to the advertiser. For example, where the advertiser is MillerCoors, the contents of the "competing brands" field 1160 may comprise "Anheuser-Busch", "Budweiser", "Rolling Rock" "Busch", and "Michelob". The contents of the "competing brands" field 1160 may be chosen or specified by the advertiser, or it may be suggested by the service provider and approved by the advertiser.

Figure 4:
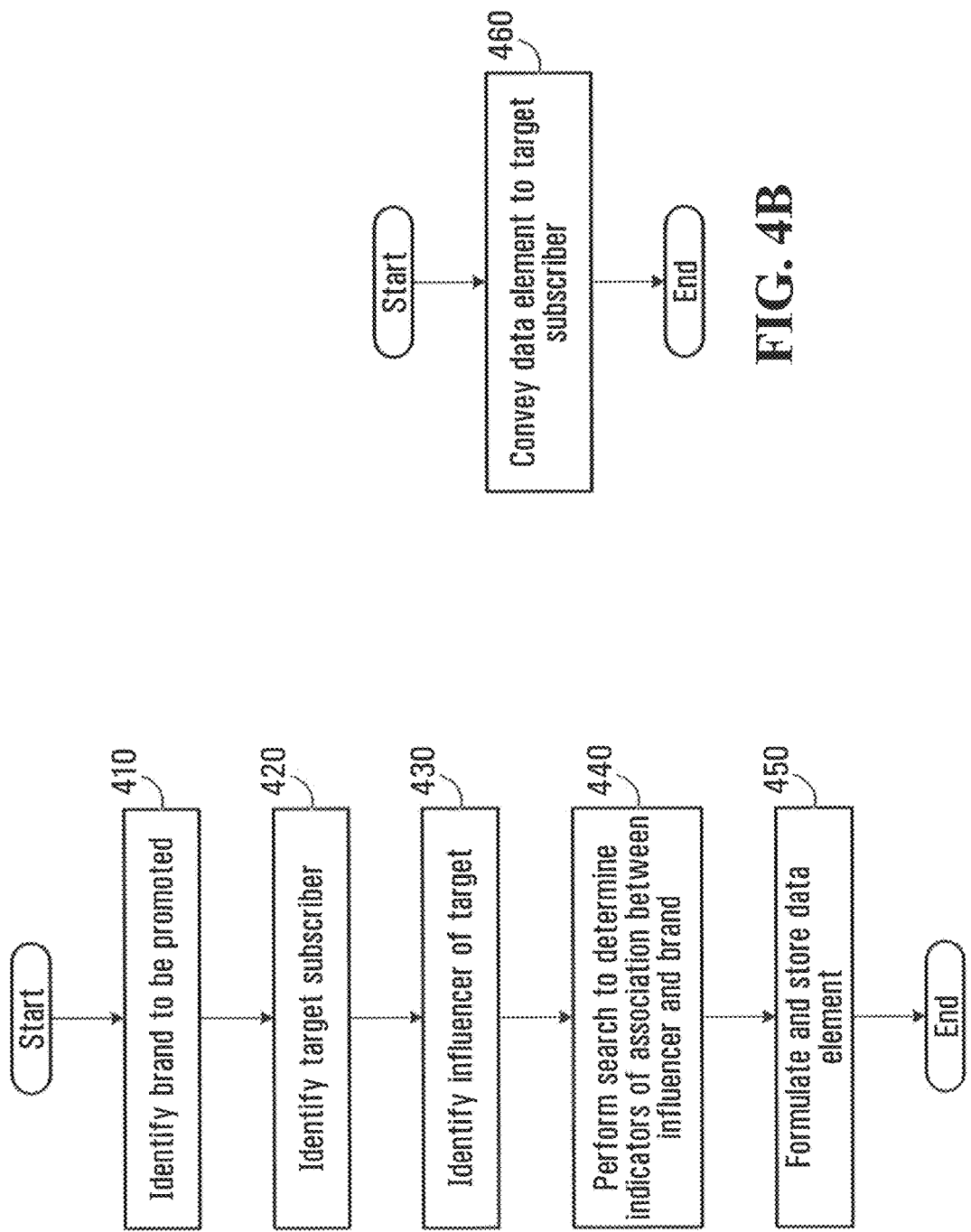
FIG. 4A is a flowchart of an example advertising method in accordance with a specific non-limiting example embodiment of the present invention.
FIG. 4B shows a step of conveying a data element generated using the method of FIG. 4A.

The method executed by the server for a target subscriber then includes the above steps 410-450 in relation to FIG. 4, which produces a modified outcome as now explained:

At step 410, a brand associated with the promotional campaign is identified/selected. In this case, the brand associated with the promotional campaign refers to a brand that is specified in the "competing brands" field 1160 of the promotional campaign database 130. This is in contrast to the outcome of step 410 in the first embodiment described above, where the brand identified at step 410 as being associated with the promotional campaign was the advertiser's own brand.

At step 420, the server executing the method identifies a target subscriber for the promotional campaign. This step is identical to the previous instantiation of step 420.

At step 430, the server executing the method identifies one or more influencers of the target subscriber. This information can be obtained by consulting the "influencers" field 270 in the appropriate row 220 of the subscriber database 120 corresponding to the target subscriber. This step is similar to the previous instantiation of step 430. However, the outcome will be different because the content of the "influencers" field 270 now represents individuals or corporations that the target subscriber mistrusts or disapproves of.

At step 440, the server executing the method determines one or more indicators of association between the influencer identified at step 430 (which, it will be recalled, is someone that the target subscriber mistrusts) and the brand identified at step 410 (which, it will be recalled, is a competing brand). In one embodiment, the indicator of association between the influencer and the brand can refer to evidence (either textual, photographic, audio, etc.) that the competing brand is endorsed by the influencer. In another embodiment, the indicator of association between the influencer and the competing brand can refer to material showing that there is a positive association between the influencer and the brand. In another embodiment, the indicator of association between the influencer and the brand can refer to material which, when perceived by a subscriber, is likely to leave the subscriber with an impression or conclusion that the influencer has a favorable view of the brand.

Thus, an indicator of association between the (mistrusted) influencer and the (adverse/competing) brand may be manifested in the form of an image, article, Internet hyperlink, tweet, blog entry, comment, bibliographic citation and so on.

In order to determine the one or more indicators of association between the influencer and the brand, the server executing the method may conduct a search, such as an Internet search.

In accordance with one non-limiting embodiment, the search performed at step 440 may include visiting a public section of a social media site purported to represent the influencer. Images, messages, comments, tweets and other data elements are analyzed, and those which establish a positive link between the influencer and the brand can be identified and retrieved fro further processing.

In accordance with another non-limiting embodiment, the search performed at step 440 may involve establishing a connection to a search engine website. A search query supplied to the search engine website can be automatically formulated using a plurality of search terms including the identity of the influencer and the brand. Optionally, search terms such as "likes", "enjoys", "uses", "shops at") may also be submitted as part of the search query in order increase the probability that the results will be reflective of a positive association between the influencer and the brand. The search engine website returns one or more search results, which may be arranged in a list of Internet hyperlinks. The to search results may already be ranked by the search engine website, or they can be processed and ranked by server that is executing the method. For instance, processing may involve filtering the search results to keep only those that portray a favorable link between the (mistrusted) influencer and the (competing) brand, as evaluated by the presence of positive visual or textual cues.

For example, assume that the electronics company Kabushiki Kaisha Canon wishes to run an advertising campaign for its cameras. The "brand(s)" field 360, which is optional, may include information pertaining to Kabushiki Kaisha Canon's camera brands. For its part, the "competing brands" field 1160 may include camera brands such as Nikon™, Coolpix™, Pentax™, and Sony™. Assume now that a target subscriber is found to have a negative opinion of Ashton Kutcher. This can be determined by detecting and processing comments placed by the target subscriber on various celebrity gossip websites (e.g., www.tribute.ca). Thus, execution of step 430 reveals that Ashton Kutcher is an influencer of the target subscriber (although in a negative sense, i.e., Ashton Kutcher is someone that the target subscriber disapproves of). Next, during execution of step 440, an Internet search may be performed, and this may reveal a website http://ashton.nikonusa.com/Coolpix/nikon-ads.aspx, which shows that Ashton Kutcher is a spokesperson for the Nikon brand of cameras. This establishes the existence of a positive association between Ashton Kutcher and Nikon™ (as well as Coolpix™). A data element is derived from the aforementioned web page (http://ashton.nikonusa.com/Coolpix/nikon-ads.aspx), which can be a summary of the content of the web page, a link to it, a picture taken from it, etc. The data element may be stored by the server in the ad spool 1010 in association with the target subscriber and the advertiser (Kabushiki Kaisha Canon).

Thus, the above process has the potential to identify instances where a particular brand appears to be endorsed by someone who is negatively perceived or disrespected by a subscriber. The influencer may or may not be conscious of the fact that he or she is being viewed as endorsing the brand. Additionally, the influencer may be unaware that he or she is perceived negatively by the subscriber. Meanwhile, the user is deliberately exposed to this endorsement in a targeted but subtle manner, in the hopes (from the advertiser's point of view) of generating decreased goodwill in the competing brand. When there are few (e.g., two or three) main brands in the marketplace, each with a relatively large market share (i.e., a de facto oligopoly), this technique can effectively sway a certain group of subscribers (i.e., those who mistrust the influencer) away from the competing brands and towards the advertiser's brand without ever mentioning the advertiser's own brand.

Further Variant

A further variant can be contemplated. Specifically, as in the first variant, let the "influencer" of a given subscriber continue to represent an individual or entity that the given subscriber disapproves of, disrespects or mistrusts, or has "unfollowed" (e.g., on Twitter™) or "unfriended" (e.g., on Facebook™). This sentiment of disapproval can be inferred from actions of the subscriber, based on monitoring activity performed by or reported to the service provider control network 114. The influencers that are identified in this manner can be recorded in the "influencers" field 270 of the subscriber database 120, with the understanding that they represent mistrusted influencers rather than trusted influencers.

In this case, since the influencer is negatively perceived by the subscriber, the advertiser may be interested in influencing the subscriber by inferring the existence of a link between the influencer and the brand that the advertiser is trying to promote. This inference may be drawn from instances where the influencer (who is mistrusted) has expressed a negative opinion of the brand. As such, the advertiser expects that the negative perception of the brand by someone who is mistrusted by the subscriber effectively translates into a positive impression of the brand by the subscriber.

To this end, the present embodiment uses the promotional campaign database 330 of FIG. 3, in which each of the rows 320 was shown to include a "brand(s)" field 360, an "ad timing and frequency" field 340 and a "rate" field 350 as previously described. The contents of the "brand(s)" field 360 may identify a specific trademark, logo, service name, event or location associated with the advertiser.

The method executed by the server for a target subscriber then includes the above steps 410-450 in relation to FIG. 4A, which produces a modified outcome as now explained:

At step 410, a brand associated with the promotional campaign is identified/selected. This step is identical to the previous instantiation of step 410. In particular, a server executing the method may access the promotional campaign database 130 and read the contents of the "brand(s)" field 360 therein. In a specific non-limiting embodiment, the brand may represent a trademark for of goods (car, camera, laundry detergent, smartphone, appliance, beverage, etc.), the name of a store (retail, wholesale, distribution, online, etc.), a place (country, city, neighborhood, tourist destination, etc.), an event (jazz festival, museum exhibit, movie, blood drive, etc.), a provider of a service (restaurant, hotel, moving company, hair salon, cross-border logistics provider, accounting firm, airline, etc.), a political party, a radio station, and so on. It should also be appreciated that the brand may be textual and/or graphics-based and/or shape-based. While a brand may be a trademark, this is not a requirement of the present invention.

At step 420, the server executing the method identifies a target subscriber for the promotional campaign. This step is identical to the previous instantiation of step 420.

At step 430, the server executing the method identifies one or more influencers of the target subscriber. This information can be obtained by consulting the "influencers" field 270 in the appropriate row 220 of the subscriber database 120 corresponding to the target subscriber. This step is identical to the instantiation of step 430 as described with respect to the first variant. That is, the outcome of this step is the identification of an individual or corporation that the target subscriber mistrusts or disapproves of.

At step 440, the server executing the method determines one or more indicators of association between the influencer identified at step 430 (which, it will be recalled, is someone that the target subscriber mistrusts) and the brand identified at step 410 (which, it will be recalled, belongs to the advertiser). In this case, the association sought is a negative one. That is, in one embodiment, the indicator of association between the influencer and the brand can refer to evidence (either textual, photographic, audio, etc.) that there is contempt of disdain for the brand by the influencer. In another embodiment, the indicator of association between the influencer and the brand can refer to material showing that there is a negative association between the influencer and the brand. In another embodiment, the indicator of association between the influencer and the brand can refer to material which, when perceived by a subscriber, is likely to leave the subscriber with an impression or conclusion that the influencer has an unfavorable view of the brand.

Thus, an indicator of association between the influencer and the brand may be manifested in the form of an image, article, Internet hyperlink, tweet, blog entry, comment, bibliographic citation and so on.

In order to determine the one or more indicators of association between the influencer and the brand, the server executing the method may conduct a search, such as an Internet search.

In accordance with one non-limiting embodiment, the search performed at step 440 may include visiting a public section of a social media site purported to represent the influencer. Images, messages, comments, tweets and other data elements are analyzed, and those which establish a (negative) link between the (untrusted) influencer and the brand can be identified.

In accordance with another non-limiting embodiment, the search performed at step 440 may involve establishing a connection to a search engine website. A search query supplied to the search engine website can be automatically formulated using a plurality of search terms including the identity of the influencer, the brand and an element of negativism. The element of negativism may include words such as (such as "hates", "dislikes", "shuns", "despises") may also be submitted as part of the search query in order increase the probability that the results will be reflective of a negative association between the influencer and the brand. The search engine website returns one or more search results, which may be arranged in a list of Internet hyperlinks. The search results may already be ranked by the search engine website, or they can be processed and ranked by server that is executing the method. For instance, processing may involve filtering the search results to keep only those that portray an unfavorable link between the influencer and the brand, as evaluated by the presence of negative visual or textual cues.

For example, assume that garment company Levi Strauss & Co. wishes to run an advertising campaign for its jeans. The "brand(s)" field 360 may include information pertaining to Levi Strauss & Co. and its brands (e.g., Levis™). Assume that a target subscriber is found to have a low opinion of Stephen Colbert. This can be determined by detecting and processing comments placed by the target subscriber on Stephen Colbert's website (www.colbertnation.com). Thus, execution of step 430 reveals that Stephen Colbert is an influencer of the target subscriber (although in a negative sense, i.e., the target subscriber dislikes Stephen Colbert). Next, during execution of step 440, an Internet search may be performed, and this may reveal an article entitled "Stephen Colbert Gives a Wag of the Finger to Levi's Snug-Fitting "Ex-Girlfriend Jeans", which is located on the Internet at "http://gawker.com/5773292/stephen-colbert-gives-a-wag-of-the-finger-to-levis-snug+fitting-ex+girlfriend-jeans". This establishes the existence of a disapproval of the brand "Levis" by Stephen Colbert. A data element is derived from the aforementioned article, which can be a summary of the content of the article, an online link to it, a picture taken from it, etc. The data element may be stored by the server in the ad spool 1010 in association with the target subscriber and the advertiser (Levi Strauss & Co.).

Thus, the above process has the potential to turn instances of brand condemnation into a positive outcome for the brand owner. Specifically, the above process identifies instances where the brand to be promoted appears to be condemned by someone who is negatively perceived or disrespected by a subscriber. The influencer may or may not be conscious of the fact that his or her condemnation of the brand is being used to further the brand owner's objectives. Additionally, the influencer may be unaware that he or she is perceived negatively by the subscriber to begin with. Meanwhile, the user is deliberately exposed to this censure or condemnation in a targeted but subtle manner, in the hopes (from the advertiser's point of view) of generating increased brand notoriety from the perspective of the subscriber (i.e., by virtue of the notion that "an enemy's enemy is a friend").

Figure 8:
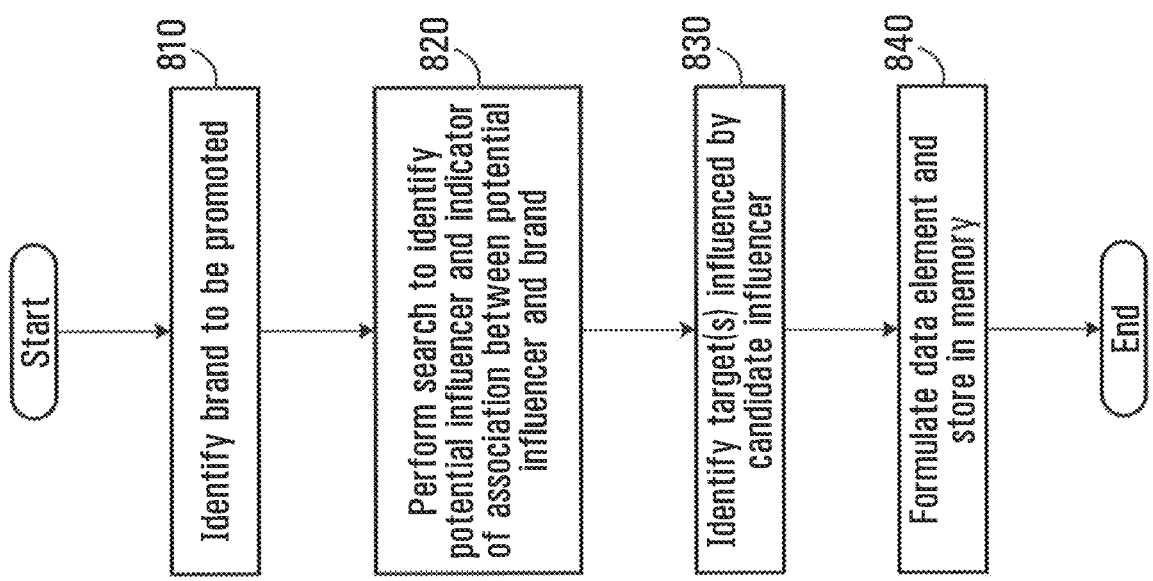
FIG. 8 is a flowchart of an example advertising method in accordance with a specific non-limiting example embodiment of the present invention.

Those skilled in the art will appreciate that although the aforementioned variants have been described in the context of the method of FIG. 4A (first embodiment), it is equally possible to adapt the method of FIG. 8 (second embodiment) to account for the additional functionality provided by these variants.

It will further be appreciated that combinations of the above approaches can be used. That is to say, for a given influencer, it is within the scope of the present invention to obtain first indicators of association where the influencer is positively associated with the brand to be advertised, as well as second indicators of association where the influencer is negatively associated with the brand to be advertised, and then to send data elements derived from the first indicators of association to those subscribers who view the influencer favorably and to send data elements derived from the second indicators of association to those subscribers who view the influencer in a dim light (i.e., where there is mistrust or apprehension). In this way, it may be possible to maximize the advertising leverage (i.e., influence) that can be obtained from a single influencer across subscribers with varying affinities relative to the influencer.

Those skilled in the art will appreciate that in some embodiments, the server(s) implementing the aforementioned method(s) may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the server(s) may utilize pre-programmed hardware or firmware elements (e.g., application specific integrated circuits (ASICs), electrically erasable programmable read-only memories (EEPROMs), flash memory, etc.), or other related components.

Persons skilled in the art should also appreciate that the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein.

What is claimed is:

1. A computer-implemented method comprising:
monitoring and controlling, by a computing device of a mobile network operator, an access network for telecommunications services by the mobile network operator and remote client devices in the access network, the telecommunications services comprising telephony services, the remote client devices being registered to one or more subscribers for the telecommunications services through the access network, the telecommunications services comprising an ability to access a computer network via the access network;
managing, by the computing device of the mobile network operator, a subscriber database comprising information on the one or more subscribers for the telecommunications services through the access network, the subscriber database comprising an influencer field that is capable of containing information of one or more influencers, managing the subscriber database comprising: for each of the one or more subscribers, identifying the one or more influencers by at least detecting a comment by the subscriber about the one or more influencers posted on at least one web page via the access network and analyzing the comment;
selecting, by the computing device of the mobile network operator, among the one or more subscribers in the subscriber database, a target subscriber receiving a data element for a promotional campaign for a first party, the promotional campaign defining (i) a target item of the first party and (ii) a second party who is a competitor of the first party;
identifying, by the computing device of the mobile network operator, at least one influencer of the selected target subscriber from the one or more influencers of the selected target subscriber using the influencer field of the database, the identification of the at least one influencer is made based on at least one comment of the target subscriber about the one or more influencers, the identification of the at least one influencer is made prior to identifying network material of the at least one influencer;
automatically formulating, by the computing device of the mobile network operator, a search query using search terms including the identity of the at least one influencer, information of the promotional campaign and information of the second party, and supplying the search query to conduct a network search for identifying the network material of the at least one influencer that is accessible through the computer network and associated with the second party defined in the promotional campaign for the first party, the network material of the at least one influencer representing at least one indicator of association between the at least one influencer and the promotional campaign;
adding the data element to an ad spool for the first party, the ad spool being remote from the remote client devices by:
creating, by the computing device of the mobile network operator, the data element based on the network material associated with the second party;
receiving approval of the data element from the first party; and
storing the data element in the ad spool for the first party; and
controlling, by the computing device of the mobile network operator, transmission of the approved data element stored in the ad spool, through the access network, to a remote client device registered to the target subscriber for display.

2. The method defined in claim 1, wherein conducting a network search comprises accessing a public section of a social media site purported to represent the target subscriber.

3. The method defined in claim 1, further comprising accessing a micro-blogging site to identify the at least one indicator of association.

4. The method defined in claim 1, further comprising monitoring web traffic exchanged by the target subscriber to identify the at least one indicator of association.

5. The method defined in claim 1, further comprising monitoring keystrokes of the target subscriber to identify the at least one influencer of the target subscriber.

6. The method defined in claim 1, further comprising consulting a list of contacts of the target subscriber and storing information on the list of contacts in the influencer field of the subscriber database.

7. The method defined in claim 1, wherein conducting a network search comprises accessing a public section of a social media site purported to represent the influencer.

8. The method defined in claim 1, wherein conducting a network search comprises accessing a blog purported to state the influencer's opinions.

9. The method defined in claim 1, wherein conducting a network search comprises launching a search query using a search engine.

10. The method defined in claim 1, wherein the target subscriber has a remote client device that has network service provided by the mobile network operator.

11. The method defined in claim 10, wherein the transmitting comprises sending a message to the remote client device, the message comprising the data element.

12. The method defined in claim 11, wherein the message is at least one of an email message and a text message.

13. The method defined in claim 10, wherein the transmitting comprises inserting the data element stored in the ad spool into a web browser window being presented on the display of the remote client device registered to the target subscriber.

14. The method defined in claim 13, wherein the data element is inserted into a portion of a browser window.

15. The method defined in claim 14, wherein the data element is placed into a service provider toolbar of the browser window.

16. The method defined in claim 1, further comprising embedding the data element into a mobile television stream.

17. The method defined in claim 1, wherein the data element comprises at least one of an image, a video, an article, a blog post, a comment and a tweet.

18. The method defined in claim 1, wherein the data element comprises a hyperlink to at least one of an image, a video, an article, a blog post, a comment and a tweet.

19. The method defined in claim 1, wherein the indicator of association comprises online material on the Internet.

20. The method defined in claim 19, wherein the data element comprises a hyperlink to the material.

21. The method defined in claim 1, further comprising condensing contents of the indicator of association to form the data element.

22. The method defined in claim 1, wherein the data element conveys endorsement of the second party by the influencer.

23. The method defined in claim 1, wherein the data element conveys condemnation of the brand of the first party by the influencer.

24. A non-transitory computer-readable storage medium storing computer-readable instructions which, when executed by a computing entity of a mobile network operator, cause the computing entity to implement a method of carrying out a promotional campaign, the method comprising:

monitoring and controlling an access network for telecommunications services by the mobile network operator and remote client devices in the access network, the telecommunications services comprising telephony services, the remote client devices being registered to one or more subscribers for the telecommunications services through the access network, the telecommunications services comprising an ability to access a computer network via the access network;

managing a subscriber database comprising information on the one or more subscribers for the telecommunications services through the access network, the subscriber database comprising an influencer field that is capable of containing information of one or more influencers, managing the subscriber database comprising: for each of the one or more subscribers, identifying the one or more influencers by at least detecting a comment by the subscriber about the one or more influencers posted on at least one web page via the access network by the subscriber and analyzing the comment;

selecting, among the one or more subscribers in the subscriber database, a target subscriber receiving a data element for a promotional campaign for a first party, the promotional campaign defining (i) a target item of the first party and (ii) a second party who is a competitor of the first party;

identifying at least one influencer of the selected target subscriber from the one or more influencers of the selected target subscriber using the influencer field of the database, the identification of the at least one influencer is made based on the at least one comment of the target subscriber about the one or more influencers, the identification of the at least one influencer is made prior to identifying network material of the at least one influencer;

automatically formulating a search query using search terms including the identity of the at least one influencer, information of the promotional campaign and information of the second party, and supplying the search query to conduct a network search for identifying the network material of the at least one influencer that is accessible through the computer network and associated with the second party defined in the promotional campaign, the network material of the at least one influencer representing at least one indicator of association between the at least one influencer and the promotional campaign;

adding the data element to an ad spool for the first party, the ad spool being remote from the remote client devices by:
  creating the data element based on the network material associated with the second party;
  receiving approval of the data element from the first party; and
  storing the data element in the ad spool for the first party; and controlling transmission of the approved data element stored in the ad spool, through the access network, to a remote client device registered to the target subscriber for display.

25. The method defined in claim 1, wherein the one or more influencers comprise at least one of a trusted influencer and an untrusted influencer, and wherein monitoring access to digital content items by one or more subscribers through an access network comprises identifying the at least one of the trusted influencer and the untrusted influencer.

* * * * *